United States Patent
Lee et al.

(10) Patent No.: US 11,297,608 B2
(45) Date of Patent: Apr. 5, 2022

(54) METHOD FOR TRANSMITTING UPLINK CONTROL INFORMATION IN WIRELESS COMMUNICATION SYSTEM AND DEVICE THEREFOR

(71) Applicant: LG ELECTRONICS INC., Seoul (KR)

(72) Inventors: Kilbom Lee, Seoul (KR); Jaehoon Chung, Seoul (KR); Kyuseok Kim, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/306,389

(22) PCT Filed: May 18, 2017

(86) PCT No.: PCT/KR2017/005161
§ 371 (c)(1),
(2) Date: Nov. 30, 2018

(87) PCT Pub. No.: WO2017/209417
PCT Pub. Date: Dec. 7, 2017

(65) Prior Publication Data
US 2020/0196301 A1 Jun. 18, 2020

Related U.S. Application Data

(60) Provisional application No. 62/345,012, filed on Jun. 3, 2016.

(51) Int. Cl.
*H04W 72/04* (2009.01)
*H04W 74/08* (2009.01)

(52) U.S. Cl.
CPC ... *H04W 72/0413* (2013.01); *H04W 74/0833* (2013.01)

(58) Field of Classification Search
CPC ........ H04W 72/0413; H04W 74/0833; H04W 74/004; H04B 7/0617; H04L 5/0023; H04L 5/0091
See application file for complete search history.

(56) References Cited

U.S. PATENT DOCUMENTS

| | | | |
|---|---|---|---|
| 2009/0170514 A1* | 7/2009 | Yokoyama | H04W 74/08 455/436 |
| 2010/0046425 A1* | 2/2010 | Baldemair | H04J 13/00 370/328 |

(Continued)

FOREIGN PATENT DOCUMENTS

KR 1020140129625 A 11/2014

OTHER PUBLICATIONS

LG Electronics, "Random access preamble in LAA", 3GPP TSG RAN WG1 meeting #85, May 23-27, 2016, R1-164500.

(Continued)

*Primary Examiner* — Gregory B Sefcheck
*Assistant Examiner* — Joshua Smith
(74) *Attorney, Agent, or Firm* — Dentons US LLP

(57) ABSTRACT

Disclosed are an information transmission method and terminal for: determining from a base station that a beam mismatch has occurred; transmitting a terminal-specifically allocated RACH preamble to the base station in order to transmit beam-related information indicating that the beam mismatch to the base station; receiving, from the base station, a message (for example, RACH response) for requesting transmission of the beam-related information; and transmitting uplink control information including the beam-related information to the base station.

13 Claims, 7 Drawing Sheets

(56) References Cited

U.S. PATENT DOCUMENTS

| | | | | |
|---|---|---|---|---|
| 2010/0322096 | A1* | 12/2010 | Hsu | H04W 74/002 370/252 |
| 2011/0165871 | A1* | 7/2011 | Juergen | H04W 16/26 455/424 |
| 2012/0320874 | A1* | 12/2012 | Li | H04W 48/12 370/331 |
| 2013/0070720 | A1* | 3/2013 | Pan | H04B 7/0645 370/329 |
| 2013/0077523 | A1* | 3/2013 | Ko | H04L 5/001 370/252 |
| 2013/0301619 | A1* | 11/2013 | Singh | H04W 56/0045 370/336 |
| 2014/0056256 | A1 | 2/2014 | Kim et al. | |
| 2014/0064190 | A1* | 3/2014 | Lee | H04W 74/0833 370/328 |
| 2014/0091968 | A1 | 4/2014 | Harel et al. | |
| 2014/0177607 | A1* | 6/2014 | Li | H04W 52/42 370/336 |
| 2014/0376466 | A1* | 12/2014 | Jeong | H04B 7/0695 370/329 |
| 2015/0131568 | A1* | 5/2015 | You | H04W 72/042 370/329 |
| 2016/0029358 | A1* | 1/2016 | Hou | H04W 74/0833 370/329 |
| 2016/0099763 | A1* | 4/2016 | Chen | H04B 7/063 370/329 |
| 2016/0157267 | A1* | 6/2016 | Frenne | H04B 7/0617 370/329 |
| 2016/0183233 | A1* | 6/2016 | Park | H04L 5/001 370/331 |
| 2016/0191137 | A1* | 6/2016 | Song | H04L 27/2613 370/329 |
| 2016/0192433 | A1* | 6/2016 | Deenoo | H04W 72/046 370/329 |
| 2016/0353479 | A1* | 12/2016 | Wang | H04L 27/2613 |
| 2017/0094686 | A1* | 3/2017 | Ramamurthi | H04L 27/2633 |
| 2017/0215117 | A1* | 7/2017 | Kwon | H04B 7/04 |
| 2017/0331577 | A1* | 11/2017 | Parkvall | H04B 7/0848 |
| 2018/0235013 | A1* | 8/2018 | Jung | H04W 16/28 |
| 2018/0343043 | A1* | 11/2018 | Hakola | H04B 7/0417 |
| 2018/0359790 | A1* | 12/2018 | Ingale | H04W 28/16 |
| 2019/0053286 | A1* | 2/2019 | Cho | H04B 7/0695 |

OTHER PUBLICATIONS

InterDigital Communications, "Beam-based design framework for New Radio", 3GPP TSG-RAN WG1 #85, May 23-27, 2016, R1-164874.
International Search Report from PCT/KR2017/005161, dated Sep. 14, 2017.
Written Opinion of the ISA PCT/KR2017/005161, dated Sep. 14, 2017.

* cited by examiner

METHOD FOR TRANSMITTING UPLINK CONTROL INFORMATION IN WIRELESS COMMUNICATION SYSTEM AND DEVICE THEREFOR

This application is a National Stage Application of International Application No. PCT/KR2017/005161, filed on May 18, 2017, which claims the benefit of U.S. Provisional Application No. 62/345,012, filed on Jun. 3, 2016, all of which are hereby incorporated by reference in their entirety for all purposes as if fully set forth herein.

TECHNICAL FIELD

Following description relates to a wireless communication system, and more particularly, to a method of transmitting uplink control information related to a beam mismatch in a wireless communication system and an apparatus therefor.

BACKGROUND ART

An ultrahigh frequency wireless communication system based on mmWave is configured to operate at a center frequency of several GHz to several tens of GHz. Due to the characteristic of the center frequency, a pathloss may considerably occur in a radio shadow area. It is necessary to elaborately design beamforming of a signal transmitted to a user equipment, control occurrence of a beam mismatch, and prevent the beam mismatch in consideration of the pathloss in the mmWave communication system.

DISCLOSURE OF THE INVENTION

Technical Problems

The present invention is designed to solve the aforementioned problem. An object of the present invention is to solve a beam mismatch of a user equipment from a base station in a wireless communication system.

Another object of the present invention is to improve a communication efficiency of a procedure that a user equipment transmits information for solving a beam mismatch to a base station.

The other object of the present invention is to stabilize a procedure that a base station requests information for solving a beam mismatch to a user equipment.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of transmitting beam-related uplink control information, which is transmitted by a user equipment (UE) in an mmWave communication system, includes the steps of determining an occurrence of a beam mismatch from a base station, when the beam mismatch occurs, transmitting a RACH (Random Access Channel) preamble for requesting an uplink resource to the base station to perform feedback on the beam-related control information via a UE-specifically allocated resource received from the base station to transmit the RACH preamble, receiving a message including UL assignment information for performing feedback on the beam-related control information from the base station, and transmitting uplink control information including the beam-related control information to the base station via an allocated uplink resource.

To further achieve these and other advantages and in accordance with the purpose of the present invention, according to a different embodiment, a user equipment (UE) transmitting beam-related uplink control information in an mmWave communication system includes a transmitter, a receiver, a processor connected to the transmitter and the receiver to operate. In this case, the processor is configured to determine an occurrence of a beam mismatch from a base station, when the beam mismatch occurs, transmit a RACH (Random Access Channel) preamble for requesting an uplink resource to the base station to perform feedback on the beam-related control information via a UE-specifically allocated resource received from the base station to transmit the RACH preamble, receive a message including UL assignment information for performing feedback on the beam-related control information from the base station, and transmit uplink control information including the beam-related control information to the base station via an allocated uplink resource.

In this case, the message including the UL assignment information can be transmitted via a RACH response or a physical downlink control channel (PDCCH).

The RACH preamble can be defined by one selected from the group consisting of a root value of a sequence, a cyclic shift value, a sub-band, transmission timing, and an OCC (Orthogonal Cover Code) of the sequence.

In this case, the transmission timing can designate at least one from among a plurality of RACH time axis resources. In particular, a plurality of the RACH time axis resources can include a plurality of RACH OFDM (Orthogonal Frequency Division Multiplexing) symbols.

In this case, transmission of the uplink control information can be performed by multiplexing the uplink control information with a transmission region of an uplink data channel.

The message including the UL assignment information can include a field configured by 1 bit indicating whether or not transmission of the beam-related information is permitted.

The beam-related control information can include BSI (Beam State Information).

Advantageous Effects

According to embodiments of the present invention, the following effects are expected.

First of all, since it is able to solve a beam mismatch problem of a user equipment from a base station in a wireless communication system, it is able to improve wireless connection quality in an mmWave communication system.

Second, it is able to reduce signaling overhead in transmitting and receiving information for solving a beam mismatch.

Third, a user equipment is able to stably trigger a procedure for solving a bean mismatch when communication environment is not stable.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

MODE FOR INVENTION

Figure 1:
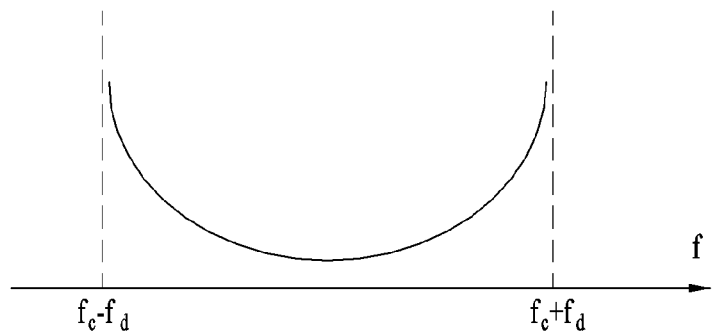
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
| --- | --- | --- | --- | --- |
| | ±0.05 ppm | ±0.1 ppm | ±10 ppm | ±20 ppm |
| 2 GHz(15 kHz) | ±100 Hz (±0.0067) | ±200 Hz (±0.0133) | 20 kHz (±1.3) | 40 kHz (±2.7) |
| 30 GHz(104.25 kHz) | ±1.5 kHz (±0.014) | ±3 kHz (±0.029) | ±300 kHz (±2.9) | ±600 kHz (±5.8) |
| 60 GHz(104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler} = (v/\lambda) \cos \theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
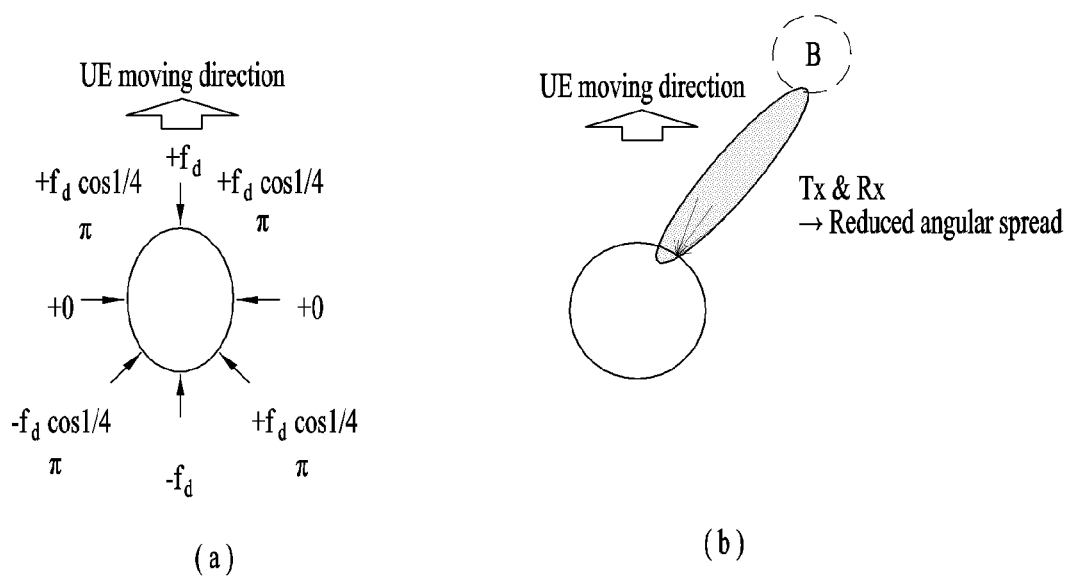
FIG. 2 is a diagram illustrating narrow beamforming related to the present invention.
Figure 3:
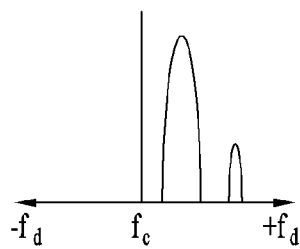
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
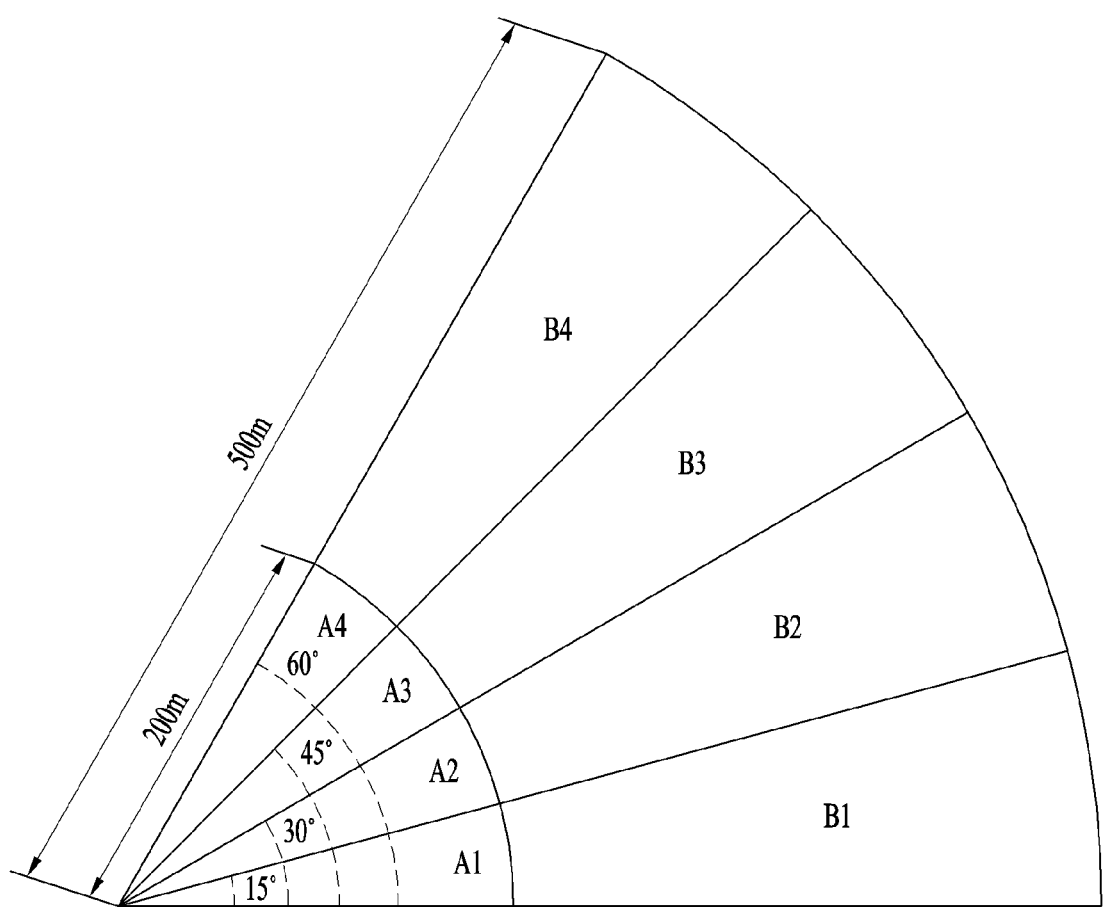
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization procedure, timing and frequency are synchronized between the base station and the UE. In order to enable UEs in a specific cell to receive and use a synchronization signal in a synchronization procedure, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2}W$$

$$SINR \to M^2 SINR \qquad \text{[Equation 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of ta beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
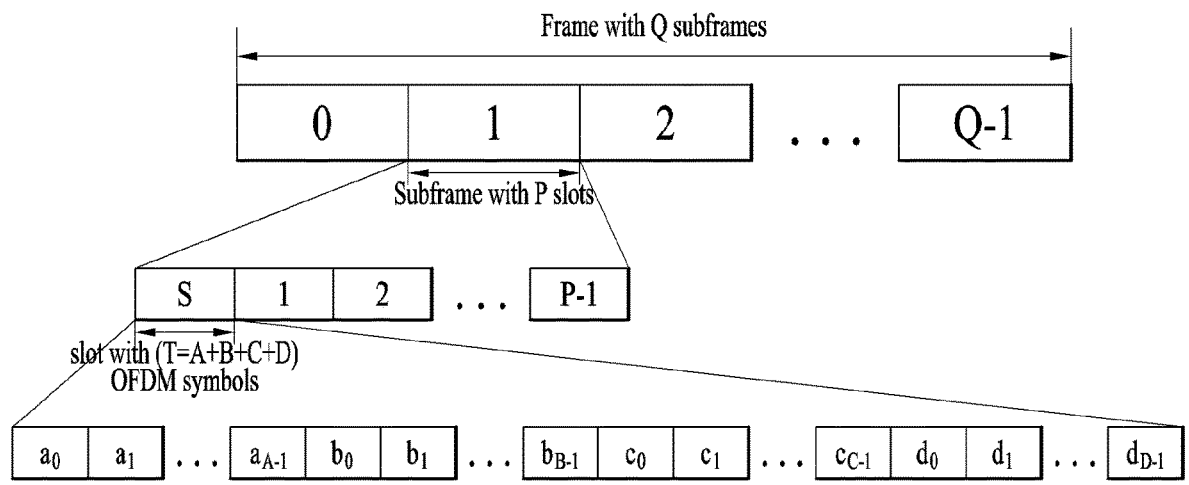
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\tilde{n}}{\mathrm{argmax}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|} \qquad \text{[Equation 3]}$$

where $$y_{\tilde{n},i} \triangleq r[\tilde{n}+i(N+N_g):\tilde{n}+i(N+N_g)+N-1]$$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))_{th}$ element to $(\tilde{n}+i(N+N_g)+N-1)_{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\tilde{n}}{\mathrm{argmax}} \frac{\left|\sum_{i=0}^{A-2} y_{\tilde{n},i}^H s\right|^2}{\sum_{i=0}^{A-2} |y_{\tilde{n},i}|^2 \sum_{i=0}^{A-1} |s|^2} \qquad \text{[Equation 4]}$$

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning procedure is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning procedure can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning procedure, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi rn(n+1)}{N}} \qquad \text{[Equation 5]}$$

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases} \qquad \text{[Equation 6]}$$

In Equation 6, $X_r^{(i)}$ is a sequence resulting from cyclic-shifting $X_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \qquad \text{[Equation 7]}$$

In equation 7, $r_1$ or $r_2$ is a coprime of N. For example, if N=111, $2 \le r_1, r_2 \le 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \qquad \text{[Equation 8]}$$

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{[Equation 9]}$$

From Equation 9, it can be observed that columns and rows are orthogonal to each other.

Figure 6:
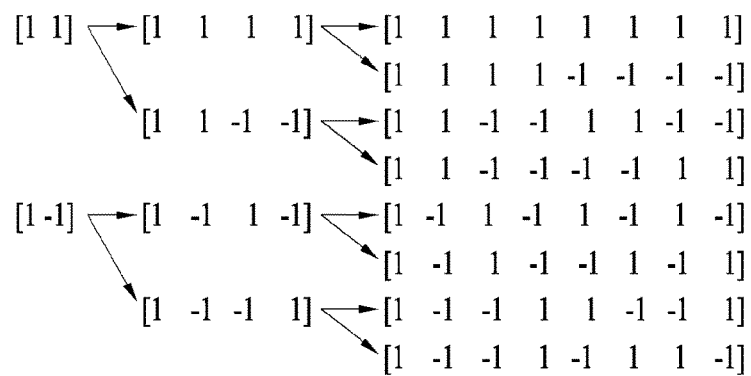
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
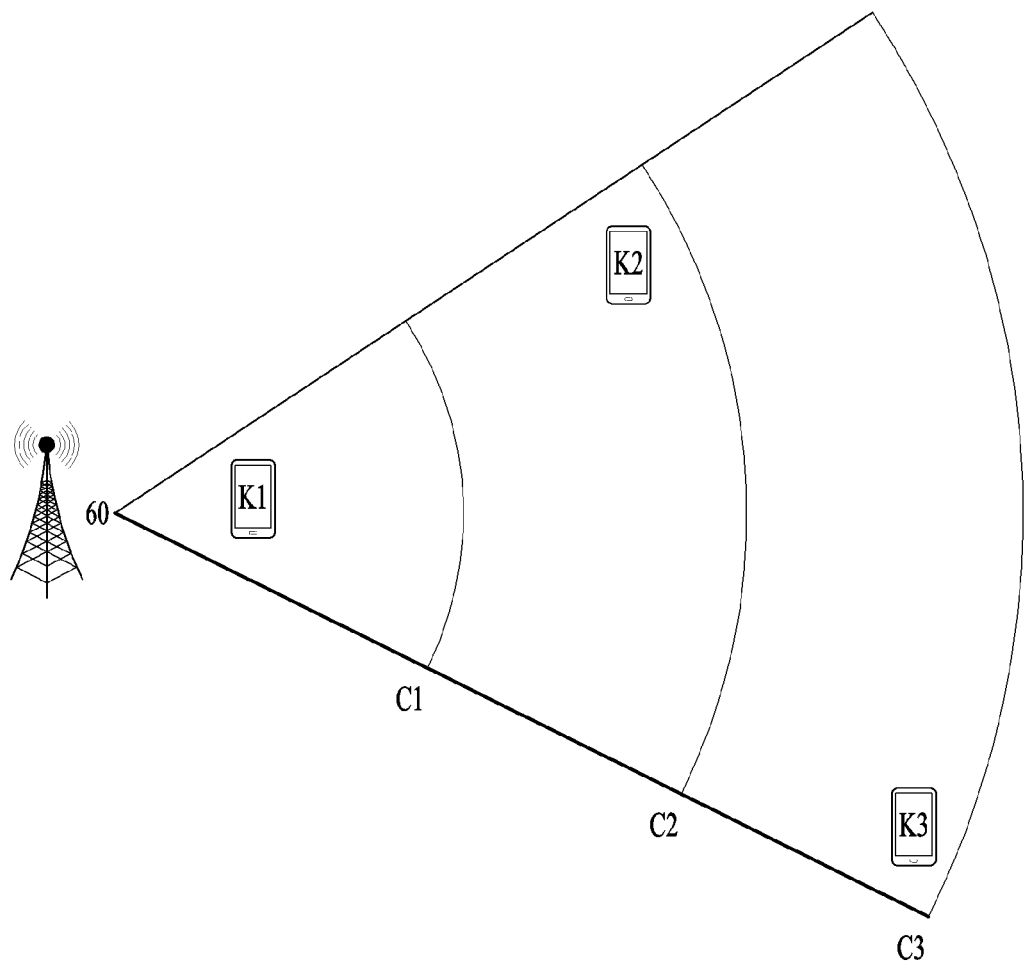
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

$$P\_PRACH\_Initial = \min\{P\_CMAX, preambleInitialReceivedTargetPower + PL\}$$ [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

In the following, phase noise related to the present invention is explained. Jitter generated on a time axis appears as phase noise on a frequency axis. As shown in equation 11 in the following, the phase noise randomly changes a phase of a reception signal on the time axis.

$$r_n = s_n e^{j\phi_n}$$ [Equation 11]

$$\text{where } s_n = \sum_{k=0}^{N-1} d_k e^{j2\pi \frac{kn}{N}}$$

Parameters of the equation 11 respectively indicate a reception signal, a time axis signal, a frequency axis signal, and a phase rotation value due to the phase noise. In the equation 11, if the reception signal is passing through a DFT (Discrete Fourier Transform) procedure, it may be able to have equation 12 described in the following.

$$y_k = d_k \frac{1}{N}\sum_{n=0}^{N-1} e^{j\phi_n} + \frac{1}{N}\sum_{\substack{t=0 \\ t\neq k}}^{N-1} d_t \sum_{n=0}^{N-1} e^{j\phi_n} e^{j2\pi(t-k)n/N}$$ [Equation 12]

In the equation 12, $$\frac{1}{N}\sum_{n=0}^{N-1} e^{j\phi_n}, \quad \frac{1}{N}\sum_{\substack{t=0 \\ t\neq k}}^{N-1} d_t \sum_{n=0}^{N-1} e^{j\phi_n} e^{j2\pi(t-k)n/N}$$

indicate a CPE (common phase error) and ICI (inter-cell interference), respectively. In this case, as correlation between phase noises is getting bigger, the CPE of the equation 12 has a bigger value. The CPE is a sort of CFO (carrier frequency offset) in a wireless LAN system. However, since the CPE corresponds to phase noise in the aspect of a terminal, the CPE and the CFO can be similarly comprehended.

A terminal eliminates the CPE/CFO corresponding to phase noise on a frequency axis by estimating the CPE/CFO. A procedure of estimating the CPE/CFO on a reception signal should be preferentially performed by the terminal to accurately decode the reception signal. In particular, in order to make the terminal precisely estimate the CPE/CFO, a base station can transmit a prescribed signal to the terminal. The signal transmitted by the base station corresponds to a signal for eliminating phase noise. The signal may correspond to a pilot signal shred between the terminal and the base station in advance or a signal changed or copied from a data signal.

TABLE 3

| UE | preambleInitialReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In the following a signal for eliminating phase noise is commonly referred to as a PCRS (Phase Compensation Reference Signal), a PNRS (Phase Noise Reference Signal).

Figure 8:
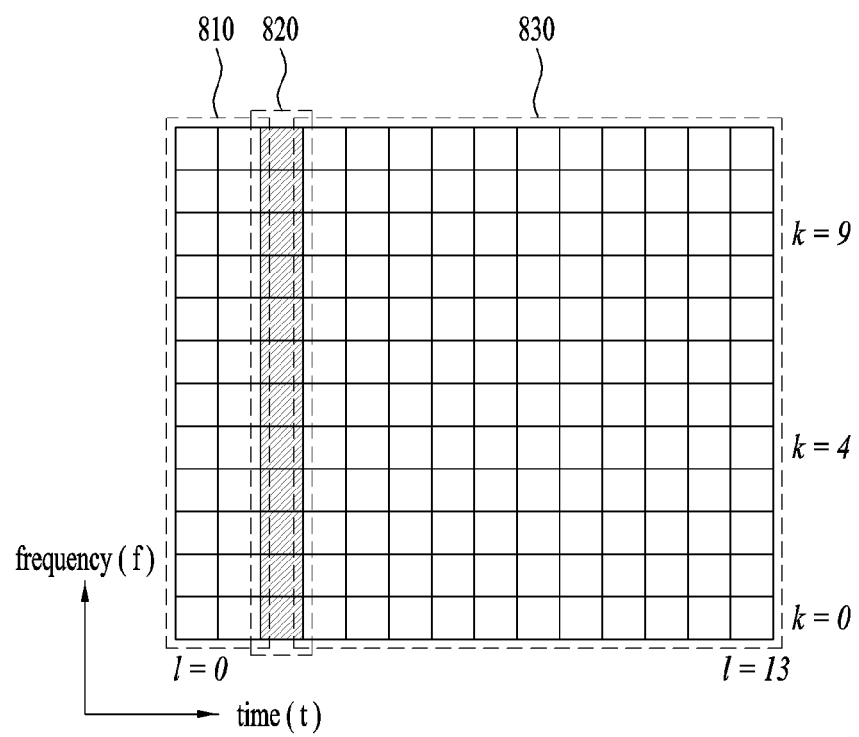
FIG. 8 is a diagram illustrating a structure of a resource region used in a communication system that uses mmWave.

FIG. 8 is a diagram illustrating a resource region structure used in a communication system using mmWave. A communication system using such a ultrahigh frequency band as mmWave uses a frequency band having physical characteristic different from that of a legacy LTE/LTE-A communication system. Hence, it is necessary for the communication system using the ultrahigh frequency band to use a structure of a resource region different from a structure of a resource region used in a legacy communication system. FIG. 8 illustrates an example of a downlink resource structure of a new communication system.

It may consider an RB pair consisting of 14 OFDM (Orthogonal Frequency Division Multiplexing) symbols in a horizontal axis and 12 subcarriers in a vertical axis. In this case, first 2 (or 3) OFDM symbols 810 are allocated for a control channel (e.g., PDCCH (Physical Downlink Control Channel)), a next one OFDM symbol 820 is allocated for a DMRS (DeModulation Reference Signal), and the remaining OFDM symbols 830 are allocated for a data channel (e.g., PDSCH (Physical Downlink Shared Channel)).

Meanwhile, in the resource region structure shown in FIG. 8, a PCRS for estimating the aforementioned CPE (or, the CFO) or a PNRS can be transmitted to a terminal in a manner of being carried on a partial RE (resource element) of the region 830 to which a data channel is assigned. The signals correspond to a signal for eliminating phase noise. As mentioned in the foregoing description, the signal may correspond to a pilot signal or a signal changed or copied from a data signal.

2. Proposed Method for Transmitting Information

As mentioned in the foregoing description, beamforming to a user equipment (UE) performed by a base station is important in a communication system that uses an mmWave band. This is because, when ultrahigh frequency bands are more used, a pathloss is getting worse. In particular, when the UE receives a signal from the base station, if the UE determines that a beam mismatch is significant based on the signal, the UE should transmit beamforming-related information to the base station to solve the beam mismatch.

In the following description, an embodiment for a UE to transmit beamforming-related information to a base station is proposed. For clarity, the beamforming-related information (or beam-related control information) transmitted to the base station by the UE is commonly referred to as BSI (Beam State Information).

In particular, when the UE determines that the degree of beam mismatch is significant, the UE can transmit BSI to the base station. The BSI can include information on a beam currently beamformed on the UE such as information on a beam index, information on beam reception power, etc. For example, the BSI can include information (e.g., a beam index, etc.) on a beam preferred by the UE. Hence, when the BSI is transmitted to the base station, it can be comprehended as a procedure that the UE informs the base station of the significance of the beam mismatch.

Meanwhile, in order for the UE to transmit the BSI to the base station, it is necessary for the UE to preferentially receive an uplink grant from the base station. In particular, in order for the UE to transmit beamforming-related information (BSI) to the base station, a procedure for indicating the necessity of the UL grant is preferentially required.

The UE can transmit a signal for requesting the UL grant to the base station before transmitting the BSI to the base station. The signal for requesting the UL grant may correspond to an SR (Scheduling Request). Having received the SR from the UE, the base station transmits xPUSCH (x-Physical Uplink Shared Channel) UL grant to the UE via xPDCCH (x-Physical Downlink Control Channel) in response to the SR.

In this case, a field for granting control information multiplexing is defined in the UL grant transmitted by the base station. In the following, the field is referred to as a UL feedback request field. When the base station allows the UE to perform multiplexing on uplink control information (e.g., BSI) and transmit the multiplexed uplink control information (i.e., piggyback), a value of the UL feedback request field is enabled by '1'. When the base station does not allow the UE to transmit uplink control information (e.g., BSI), the value of the UL feedback request field is disabled by '0'. Configuring the value of the UL feedback request by '1' and '0' is just an example only. The value can be configured in an opposite way or can be configured by a different value. In particular, the value can be configured by a bit value for allowing or not allowing the UE to perform a procedure of multiplexing and transmitting control information.

Meanwhile, when the UE checks the value of the UL feedback request field and the transmission of the UL control information is granted, the UE multiplexes beam-related UCI (Uplink Control Information) with data via xPUSCH and transmits the multiplexed beam-related UCI to the base station. The beam-related UCI may correspond to the aforementioned BSI and indicate the base station to control beamforming or perform beamforming again due to the significance of a beam mismatch.

In the foregoing description, when a beam mismatch occurs, timing synchronization between the UE and the base station can be considerably mismatched. Moreover, it is highly probable that an SNR (Signal to Noise Ratio) level differs greatly from a case of not having a beam mismatch. Hence, although the UE transmits a signal for requesting a UL grant to the base station using a legacy SR resource (e.g., an SR resource defined in LTE standard) to transmit the BSI, the base station may fail to normally receive the signal (e.g., SR preamble) for requesting the UL grant transmitted by the UE.

In the following, an embodiment for a UE to trigger BSI transmission using a RACH (Random Access Channel) resource rather than an SR is proposed in consideration of the aforementioned contents. In this case, the RACH resource corresponds to a resource allocated for the purpose of performing random access. In particular, the present invention explains a method for the UE to trigger BSI transmission using a RACH resource usable for the purpose of performing random access (e.g., a purpose of establishing a radio link as an initial access (RRC IDLE→RRC CONNECTED), a purpose of re-establishing a radio link after a radio link failure, a purpose of forming UL synchronization with a new cell in handover, a purpose of forming UL synchronization when a UE is in RRC_CONNECTED state but UL is not synchronized, and the like).

According to the proposed embodiment, a base station can define a dedicated RACH resource by differentiating at least one selected from the group consisting of a root value of a RACH sequence, a cyclic shift value, a sub-band, and transmission timing. Subsequently, the base station can UE-specifically allocate the dedicated RACH resource to a UE via DCI (Downlink Control Information) or RRC (Radio Resource Control) signaling.

In this case, the base station can designate one or more RACH time axis resources as transmission timing of a specific UE. In this case, a plurality of the RACH time axis resources can be configured by a plurality of RACH OFDM symbols.

In this case, when a beam mismatch occurs, the UE transmits a dedicated RACH resource allocated to the UE to the base station. The base station is able to recognize that the specific UE intends to feedback and transmit UCI via xPUSCH (x-Physical Uplink Shared Channel) to the base station based on a dedicated RACH preamble received from the UE.

[Equation 13]
$$a_{k,l} = c \cdot x_u(n) e^{-j\frac{2\pi}{12}vk}, v \in \{0, 1, 2, \ldots, 11\}$$
$$k = n + 1 + 12 * (6 * N_{RACH} + 51),$$
$$N_{RACH} \in \{0, 1, \ldots, 7\}$$
$$n = 0, 1, \ldots 70$$
$$c = \begin{cases} 1 & \text{if } b \text{ is even} \\ c' & \text{if } b \text{ is odd} \end{cases}$$
$$c' \in \{-1, 1\},$$
$$b \in \{(0, 1), (2, 3), (4, 5), (6, 7), (8, 9)\}$$

Equation 13 illustrates a procedure of generating a RACH preamble. In Equation 13, $x_u(n)$ denotes an $n^{th}$ element of a ZC sequence of which a root value corresponds to u. v and $N_{RACH}$ denote a cyclic shift value and a sub-band on which an RACH sequence is transmitted, respectively. b denotes an OFDM symbol index (or a sequence index in an RACH subframe) in a subframe in which RACH is transmitted.

A base station can generate a unique RACH preamble by combining u, v, and $N_{RACH}$. The base station can UE-specifically allocate the generated RACH preamble to a UE. In this case, when the UE determines that a beam mismatch occurs, the UE can transmit the dedicated RACH preamble allocated to the UE to the base station. When the dedicated RACH preamble is received from the random UE, the base station can recognize that the UE has requested allocation of a resource for performing feedback on UCI.

When the base station UE-specifically allocates the RACH preamble to a UE, the base station can designate the timing capable of transmitting the RACH preamble to the UE. In particular, in addition to a value (root value, cyclic shift value) specifying a sequence and a sub-band, the UE-specifically allocated RACH preamble can specifically allocate the transmission timing of the RACH preamble to the UE.

In this case, the base station can designate one or more RACH time axis resources as transmission timing of a specific UE. In this case, a plurality of the RACH time axis resources can be configured by a plurality of RACH OFDM symbols.

Figure 9:
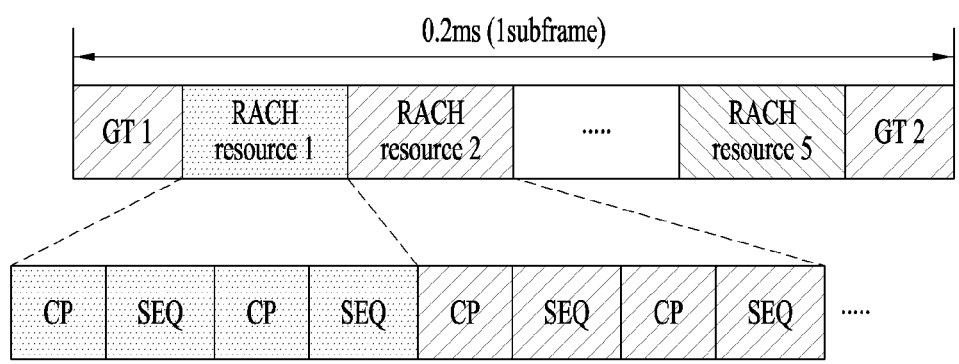
FIG. 9 is a diagram illustrating a structure of a RACH (Random Access Channel) subframe related to a proposed embodiment.

FIG. 9 is a diagram illustrating a structure of a RACH (Random Access Channel) subframe related to a proposed embodiment. Referring to FIG. 9, one RACH subframe includes 5 RACH resources and each of the RACH resources includes 2 sequences. In particular, one RACH subframe includes 10 RACH sequences. The b mentioned earlier in equation 13 denotes each of the RACH sequence indexes in FIG. 9. The c mentioned earlier in equation 13 corresponds to a weight by which each of the sequences is multiplied. The c is always 1 for an even-numbered sequence and the c is defined by 1 or −1 for an odd-numbered sequence. In the following description, unless there is a special citation, assume that the c corresponds to 1.

Figure 10:
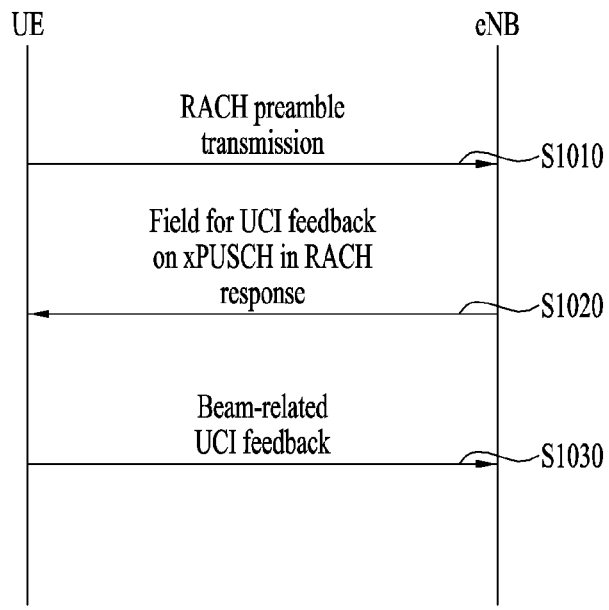
FIG. 10 is a flowchart illustrating an information transmission method according to a proposed embodiment.

FIG. 10 is a flowchart illustrating an information transmission method according to a proposed embodiment. FIG. 10 illustrates operations of a UE and a base station after a UE-specific RACH preamble is allocated according to the aforementioned procedure.

First of all, when a beam mismatch occurs and the UE determines that it is necessary to transmit beam-related uplink control information (e.g., BSI) to the base station, the UE transmits a RACH preamble to the base station using a dedicated RACH resource allocated to the UE in advance [S1010]. The RACH preamble can be comprehended as a signal indicating that it is necessary for the UE to transmit feedback on UCI including BSI to the base station.

Having received the request from the UE, the base station determines that the beam mismatch has occurred on the UE. The base station defines the aforementioned UL feedback request field (or xPUSCH UCI feedback request field), sets a value of the field to 0 or 1, and transmits the field to the UE [S1002]. In this case, the UL feedback request field (or xPUSCH UCI feedback request field) can be transmitted to the UE in a manner of being included in a RACH response or PDCCH (for clarity, a response signal transmitted in response to the RACH preamble is referred to as a RACH response) which is transmitted by the base station in response to the RACH preamble transmitted by the UE. In this case, the UL feedback request field can be utilized for the purpose of indicating whether or not the UE is allowed to transmit the BSI.

Meanwhile, a UL feedback request (or xPUSCH UCI feedback request) may correspond to a procedure that the base station asks the UR to transmit UCI including BSI by performing multiplexing on the UCI. The UL feedback request field (or xPUSCH UCI feedback request field) can be periodically or aperiodically transmitted to the UE. In the step S1020, the base station can forward the UL feedback request field (or xPUSCH UCI feedback request field) to the UE by transmitting DCI rather than the RACH response to the UE.

The UE checks a value of the UL feedback request field (or xPUSCH UCI feedback request field). If the UE is allowed to perform multiplexing on BSI and transmit the multiplexed BSI, the UE performs multiplexing on beam-related information including the BSI via xPUSCH and transmits the BSI to the base station [S1030]. Of course, in the step S1020, if a value of the received field is not a value for requesting BSI transmission, the UE does not transmit the BSI to the base station. In this case, it is necessary to note that a following RACH procedure is not performed although a RACH preamble and a RACH response are transmitted and received between the UE and the base station. In particular, when the RACH preamble/response is transmitted and received, a procedure of transmitting the BSI transmitted by the UE is performed instead of a procedure of transmitting an RRC connection request message transmitted by the UE or a procedure of transmitting an RRC completion message transmitted by the base station.

According to the aforementioned embodiment, when there is a room for an idle RACH resource, since it is able to utilize the idle RACH resource, it may have a merit in that system overhead is relatively low. And, when a UE is in a state of being connected with a base station via RRC, although timing is not synchronized between the UE and the base station due to a beam mismatch, since it is able to stably perform a RACH procedure, the base station can receive a request from the UE with a higher probability compared to a case of using an SR. Moreover, since a RACH response is received from the base station, it may have a merit in that the UE is able to align the timing with the base station. And, it may have a merit in that the UE is able to stably perform beam recovery on a beam mismatch, which may occur when the UE switches a dormant state (or DRX, discontinuous reception mode) into an active state.

Figure 11:
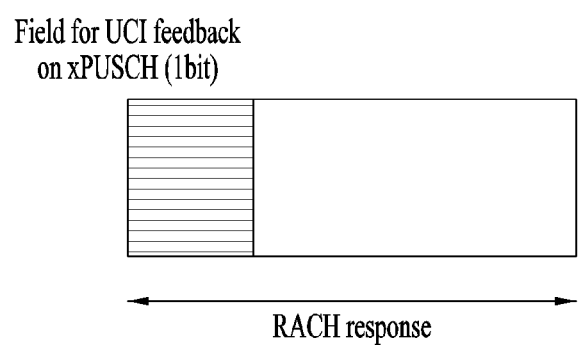
FIG. 11 is a diagram illustrating a field configuration method according to a proposed embodiment.

FIG. 11 is a diagram illustrating a field configuration method according to a proposed embodiment. FIG. 11 illustrates an example of configuring the aforementioned UL feedback request field (or xPUSCH UCI feedback request field) of the base station.

As illustrated in FIG. 11, according to a proposed embodiment, the UL feedback request field (or xPUSCH UCI feedback request field) is defined in a RACH response rather than a UL grant. Having received a dedicated RACH preamble transmitted by the UE, the base station determines a value of a specific field of a RACH response signal to be transmitted to the UE by 1. As mentioned in the foregoing description, the specific field can be configured by 1 bit. Although FIG. 11 illustrates that the field is implemented by the very first bit of a RACH response, by which the present invention may be non-limited. The field can also be implemented by a middle bit or the last bit of the RACH response. When a value of the bit corresponds to '1', it indicates that multiplexing and transmission of BSI are requested (allowed). When the value of the bit corresponds to '0', it indicates that multiplexing and transmission of BSI are not requested (not allowed). Of course, a bit value and meaning of the bit value can be configured in reverse.

Figure 12:
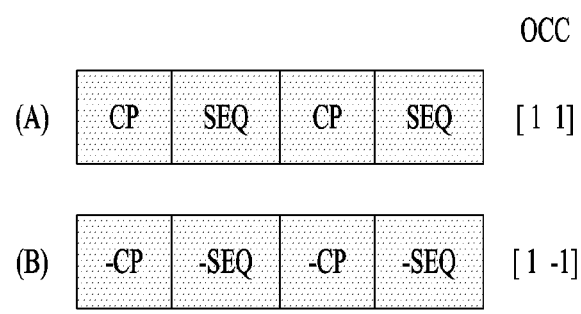
FIG. 12 is a diagram illustrating a method of applying an OCC (Orthogonal Cover Code) according to a proposed embodiment.

FIG. 12 is a diagram illustrating a method of applying an OCC (Orthogonal Cover Code) according to a proposed embodiment. In the aforementioned embodiment, it may be able to define a further different dedicated RACH resource by applying an OCC to a repeating structure defined in a RACH preamble.

Assume a case that the same sequence (same root value, same cyclic shift value), the same sub-band, and the same transmission timing are allocated to a UE A and a UE B. And, c value of an even-numbered/odd-numbered sequence of the UE A is defined by 1, 1. On the other hand, c value of an even-numbered/odd-numbered sequence of the UE B is defined by 1, −1. This embodiment is illustrated in FIG. 12.

In this case, a base station can designate one or more RACH time axis resources as transmission timing of a specific UE. In this case, a plurality of the RACH time axis resources can be configured by a plurality of RACH OFDM symbols.

As shown in FIG. 12, when OCCs applied to a sequence are distinguished from each other, a RACH preamble allocated to the UE A is distinguished from a RACH preamble allocated to the UE B. In particular, when an OCC [1 1] is allocated to the UE A and an OCC [1 −1] is allocated to the UE B, since the two OCCs are orthogonal to each other, the base station is able to identify RACH preambles of the two UEs. Meanwhile, as mentioned in the foregoing description, when the b of equation 13 corresponds to an odd number, the c value may have 1 or −1. The embodiment mentioned earlier in FIG. 12 corresponds to the abovementioned contents.

According to an additional embodiment, when a UE fails to receive a dedicated RACH resource from a base station, the present invention proposes a method for the UE to transmit beam-related uplink control information (e.g., BSI) to the base station.

Unlike the aforementioned embodiment, the UE transmits a RACH preamble via a predetermined RACH resource (e.g., a RACH resource configured by LTE standard). In this case, the RACH preamble can be determined by a random sequence. In this case, unlike the aforementioned embodiment, it may have a merit in that it is not necessary to UE-specifically define an additional RACH resource. However, since the predetermined RACH resource corresponds to a contention-based RACH resource, it may have a demerit in than all UEs are able to use the predetermined RACH resource. In other word, since all UEs are able to transmit and receive a signal via the (contention-based) RACH resource, a signal collision may occur.

Having received a random RACH preamble transmitted via the RACH resource, the base station transmits a RAR (RACH Response) to the UE.

Subsequently, the UE transmits an RRC connection request message to the base station using a UL resource indicated by the RAR.

In this case, the signal transmission/reception method can be performed according to a random access procedure defined in the legacy LTE standard.

The UE transmits C-RNTI (Common—Radio Network Temporary Identity) included in the RRC connection request message or information on an ID received from the base station to the base station to indicate that the RRC connection request message is used not for UL initial access but for beam recovery.

For reference, a UE in an RRC idle state can transmit an RRC connection request message to the base station according to a random access procedure defined in the legacy LTE standard to request UL initial access. In this case, a random ID is included in the RRC connection request message. In this case, the base station checks the ID information included in the RRC connection request message and can determine whether the RRC connection request message is used for UL initial access or beam recovery.

When the base station receives the RRC connection request message including C-RNTI, the base station is able to know that the UE is already in the RRC connection state. Similar to the step S1020, the base station defines a UL feedback request field (or xPUSCH UCI feedback request field), configures a value of the field by 1, and transmits the field to the UE.

Similar to the step S1030, the UE performs multiplexing on beam-related information including BSI with xPUSCH and transmits the information to the base station in response to the UL feedback request field.

In summary, according to the present invention, in order for a UE to trigger a UL grant for transmitting BSI, the UE can transmit a signal via a UE-specific RACH resource or a contention-based RACH resource.

Depending on an embodiment, a UE may or may not receive a dedicated RACH resource capable of transmitting a UL grant for BSI feedback. In this case, when the dedicated RACH resource is allocated to the UE, the UE transmits a RACH preamble to the base station via the dedicated RACH resource allocated to the UE to request a UL grant for BSI feedback to the base station. On the other hand, when the dedicated RACH resource is not allocated to the UE, the UE transmits a RACH preamble to the base station via a contention-based RACH resource and transmits an RRC connection request message including C-RNTI to the base station via a UL resource indicated by a RAR received from the base station to request a UL grant for BSI feedback to the base station.

Additionally, the present invention proposes a method of defining xPUSCH resource request signaling for performing UCI feedback using a PUCCH format 1 resource.

According to the legacy LTE standard, total 36 PUCCH format 1 are defined in one RB (12*7=84 REs). The PUCCH format 1 corresponds to a PUCCH format for an SR only.

When the PUCCH format 1 is divided into 16 PUCCH formats and an additional 1 bit is added to each of the PUCCH formats, it is able to signal not only an SR but also xPUSCH resource request for UCI feedback.

And, it is able to apply a PUCCH format 2 to the abovementioned method. In particular, the PUCCH format 2 can also be defined by signaling for the xPUSCH resource request for UCI feedback.

In the foregoing description, a procedure of allocating a UE-dedicated RACH preamble by additionally defining a sub-band and transmission timing for a RACH preamble and a triggering procedure for UCI (e.g., BSI) feedback have been explained. According to the procedures, although a beam mismatch occurs, since a UE is able to forward beam-related information to a base station, it is able to efficiently perform a beam recovery procedure.

3. Device Configuration

Figure 13:
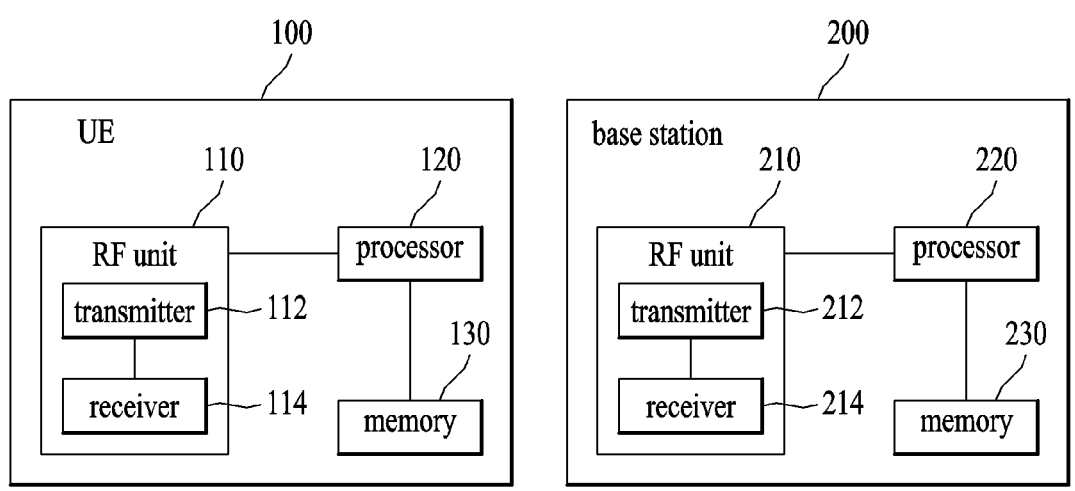
FIG. 13 is a diagram illustrating configurations of a user equipment and a base station related to an embodiment proposed in the present invention.

FIG. 13 is a block diagram showing the configuration of a user equipment and a base station according to one embodiment of the present invention. In FIG. 13, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 13, a communication environment may be established between a plurality of user equipment and the base station. In addition, the base station 200 shown in FIG. 13 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other devices. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other devices. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned contents can be applied not only to 3GPP system and LTE-A but also to various wireless communication systems including an IEEE 802.16x system and IEEE 802.11x system. Further, the proposed method can also be applied to an mmWave communication system using ultrahigh frequency band.

What is claimed is:

1. A method of operating by a user equipment (UE) in a wireless communication system, the method comprising:
    receiving, from a base station, information related to a resource allocation for a dedicated random access channel (RACH) preamble;
    determining an occurrence of a beam mismatch based on a pathloss calculated using a specific signal received from the base station;
    transmitting, to the base station, the dedicated RACH preamble for requesting scheduling of a beam related uplink feedback resource based on the occurrence of the beam mismatch; and
    receiving, from the base station, a RACH response signal related to the transmitted dedicated RACH preamble,
    wherein the RACH response signal includes information indicating whether transmission of beam related uplink feedback via a physical uplink shared channel (PUSCH) resource is permitted by the base station, and wherein based on the transmission of the beam related uplink feedback not being permitted, transmitting uplink data via the PUSCH resource.

2. The method of claim 1, wherein a resource related to the dedicated RACH preamble is assigned via radio resource control (RRC) signaling.

3. The method of claim 1, wherein based on the RACH response signal including the information indicating that the transmission of the beam related uplink feedback is permitted, transmit, to the base station, beam related uplink feedback information.

4. The method of claim 3, further comprising:
transmitting uplink control information comprising the beam related uplink feedback information via the PUSCH resource based on the RACH response signal including the information indicating that the transmission of the beam related uplink feedback is permitted, wherein the PUSCH resource is allocated via the RACH response signal.

5. The method of claim 4, wherein the uplink control information is transmitted by multiplexing the uplink control information with the uplink data in a transmission region of the PUSCH resource.

6. The method of claim 4, wherein the beam related uplink feedback information comprises at least one of beam state information (BSI) and beam refinement information (BRI).

7. A communication device operating in a wireless communication system, the communication device comprising:
a memory; and
a processor operably coupled with the memory and configured to:
receive, from a base station, information related to a resource allocation for a dedicated random access channel (RACH) preamble;
determine an occurrence of a beam mismatch based on a pathloss calculated using a specific signal received from the base station;
transmit, to the base station, the dedicated RACH preamble for requesting scheduling of a beam related uplink feedback resource based on the occurrence of the beam mismatch; and
receive a RACH response signal related to the transmitted dedicated RACH preamble,
wherein the RACH response signal includes information indicating whether transmission of beam related uplink feedback via a physical uplink shared channel (PUSCH) resource is permitted by the base station, and
wherein based on the transmission of the beam related uplink feedback not being permitted, transmit uplink data via the PUSCH resource.

8. The communication device of claim 7, wherein the dedicated RACH preamble is assigned via radio resource control (RRC) signaling.

9. The communication device of claim 7, wherein based on the RACH response signal including the information indicating that the transmission of the beam related uplink feedback is permitted, transmit, to the base station, beam related uplink feedback information.

10. The communication device of claim 9,
wherein the PUSCH resource is allocated via the RACH response signal, and
wherein the processor is further configured to transmit uplink control information comprising the beam related uplink feedback information via the PUSCH resource based on the RACH response signal including the information indicating that the transmission of the beam related uplink feedback is permitted.

11. The communication device of claim 10, wherein the processor is further configured to transmit the uplink control information by multiplexing the uplink control information with the uplink data in a transmission region of the PUSCH.

12. The communication device of claim 10, wherein the beam related uplink feedback information comprises at least one of beam state information (BSI) and beam refinement information (BRI).

13. A communication device operating in a wireless communication system, the communication device comprising:
a memory; and
a processor operably coupled with the memory and configured to:
transmit, to a user equipment (UE), information related to a resource allocation for a dedicated random access channel (RACH) preamble;
receive, from the UE, the dedicated RACH preamble; and
transmit a RACH response signal related to the dedicated RACH preamble,
wherein the dedicated RACH preamble is received from the UE based on the UE determining an occurrence of a beam mismatch,
wherein the occurrence of the beam mismatch is determined by the UE based on a pathloss calculated using a specific signal received from the communication device;
wherein the dedicated RACH preamble requests scheduling of a beam related uplink feedback resource,
wherein the RACH response signal includes information indicating whether transmission of beam related uplink feedback via a physical uplink shared channel (PUSCH) resource is permitted by the communication device, and
wherein based on the transmission of the beam related uplink feedback not being permitted, receive uplink data from the UE via the PUSCH resource.

* * * * *